(12) United States Patent
Li et al.

(10) Patent No.: US 7,413,633 B2
(45) Date of Patent: Aug. 19, 2008

(54) BELTS AND ROLL COVERINGS HAVING A NANOCOMPOSITE COATING

(75) Inventors: Cheng-Kuang Li, Steilacoom, WA (US); Crayton Gregory Toney, Wrentham, MA (US)

(73) Assignee: Albany International Corp., Albany, NY (US)

( * ) Notice: Subject to any disclaimer, the term of this patent is extended or adjusted under 35 U.S.C. 154(b) by 446 days.

(21) Appl. No.: 11/080,603

(22) Filed: Mar. 15, 2005

(65) Prior Publication Data

US 2005/0208288 A1 Sep. 22, 2005

Related U.S. Application Data

(60) Provisional application No. 60/553,424, filed on Mar. 16, 2004.

(51) Int. Cl.
*D21F 3/00* (2006.01)
*B32B 27/20* (2006.01)
*B32B 27/40* (2006.01)

(52) U.S. Cl. .............. 162/358.4; 162/901; 427/389.9; 427/394; 427/397.7; 442/70; 442/74; 442/80; 442/104; 442/148

(58) Field of Classification Search .......... 162/306, 162/348, 358.3, 358.4, 901; 442/70, 72–75, 442/101, 104, 79, 148, 227, 170, 218, 220, 442/80; 427/389.9, 394, 175, 176, 397.7; 428/167
See application file for complete search history.

(56) References Cited

U.S. PATENT DOCUMENTS

| | | | |
|---|---|---|---|
| 4,002,791 A | 1/1977 | Sawyer | |
| 4,466,164 A | 8/1984 | Tadokoro et al. | |
| 5,196,092 A | 3/1993 | Stigberg | |
| 5,238,537 A | 8/1993 | Dutt | |
| 5,298,124 A | 3/1994 | Eklund et al. | |
| 5,387,172 A | 2/1995 | Habenicht et al. | |
| 5,859,118 A * | 1/1999 | Roesler et al. ............. | 524/493 |
| 5,965,208 A | 10/1999 | Fagerholm et al. | |
| 6,036,819 A | 3/2000 | Miller et al. | |
| 6,117,932 A | 9/2000 | Hasegawa et al. | |
| 6,136,151 A | 10/2000 | Davenport et al. | |
| 6,200,248 B1 | 3/2001 | Vestola et al. | |
| 6,200,915 B1 | 3/2001 | Adams et al. | |
| 6,231,928 B1 | 5/2001 | McGahern | |
| 6,290,815 B1 | 9/2001 | Magnin et al. | |
| 6,290,818 B1 | 9/2001 | Romanski | |
| 6,331,231 B1 | 12/2001 | Inoue | |
| 6,616,814 B2 | 9/2003 | Best | |

(Continued)

FOREIGN PATENT DOCUMENTS

EP   0 952 187 A   10/1999

(Continued)

*Primary Examiner*—Eric Hug
(74) *Attorney, Agent, or Firm*—Frommer Lawrence & Haug LLP; Ronald R. Santucci

(57) ABSTRACT

The present invention relates to a urethane-based coating having nanoparticles for improving the characteristics of a papermaking process belt, roll cover and belts used in textile applications. For example, the present invention improves resistance to flex fatigue, crack propagation, groove closure and wear characteristics of urethane coatings on such belts and roll coverings. The present invention also improves the resistance to water and oil permeation characteristics of urethane coated belts and roll coverings.

20 Claims, 5 Drawing Sheets

U.S. PATENT DOCUMENTS

| | | |
|---|---|---|
| 6,905,734 B2 * | 6/2005 | Withers et al. ............... 427/425 |
| 6,927,251 B2 * | 8/2005 | Rische et al. ................ 524/591 |
| 7,153,357 B2 * | 12/2006 | Baumgart et al. ........... 106/481 |
| 2002/0060052 A1 * | 5/2002 | Best ........................ 162/358.4 |

FOREIGN PATENT DOCUMENTS

| | | | |
|---|---|---|---|
| EP | 1 069 235 A | | 1/2001 |
| EP | 1 338 696 A | | 8/2003 |
| WO | WO 01/05883 | * | 1/2001 |
| WO | WO 01/05883 A | | 1/2001 |
| WO | WO 03/059817 A | | 7/2003 |

* cited by examiner

BELTS AND ROLL COVERINGS HAVING A NANOCOMPOSITE COATING

CROSS-REFERENCE TO RELATED APPLICATIONS

This application claims priority from U.S. Provisional Application Ser. No. 60/553,424, filed on Mar. 16, 2004.

This application and each of the documents cited in this application ("application cited documents"), and each document referenced or cited in the application cited documents, either in the text or during the prosecution of this application, as well as all arguments in support of patentability advanced during such prosecution, are hereby incorporated herein by reference. Various documents are also cited in this text ("application cited documents"). Each of the application cited documents, and each document cited or referenced in the application cited documents, is hereby incorporated herein by reference.

FIELD OF THE INVENTION

The present invention relates primarily to the papermaking arts. More specifically, the present invention relates to process belts and roll coverings associated with the production of paper among other things.

BACKGROUND OF THE INVENTION

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. The yarns of the fabric that run along the direction of paper machine operation are referred to as the machine direction (MD) yarns; and the yarns that cross the MD yarns are referred to as the cross machine direction (CD) yarns. It should further be appreciated that paper manufacture is a continuous process, which proceeds at considerable speeds. That is to say, the fibrous slurry is continuously deposited onto the forming fabric in the forming section, while a newly manufactured paper sheet is continuously wound onto rolls after it exits from the dryer section.

Traditional press sections include a series of nips formed by pairs of adjacent cylindrical press rolls. Recently, the use of long press nips has been found to be advantageous over the use of nips formed by pairs of adjacent rolls. The longer the web can be subjected to pressure in the nip, the more water can be removed there, and, consequently, the less will remain to be removed through evaporation in the dryer section.

In long nip presses of the shoe type variety, the nip is formed between a cylindrical press roll and an arcuate pressure shoe. The latter has a cylindrically concave surface having a radius of curvature close to that of the cylindrical press roll. When roll and shoe are brought into close physical proximity, a nip is formed which can be five to ten times longer in the machine direction than one formed between two press rolls. This increases the so-called dwell time of the fibrous web in the long nip while maintaining the same level of pressure per square inch pressing force used in a two-roll press. The result of this new long nip technology has been a dramatic increase in dewatering of the fibrous web in the long nip when compared to conventional nips on paper machines.

A long nip press of the shoe type typically needs a special belt. This belt is designed to protect the press fabric supporting, carrying, and dewatering the fibrous web from the accelerated wear that would result from direct, sliding contact over the stationary pressure shoe. Such a belt is made, for example, with a smooth impervious surface that rides, or slides over the stationary shoe on a lubricating film of oil. The belt moves through the nip at roughly the same speed as the press fabric, thereby subjecting the press fabric to minimal amounts of rubbing against stationary components.

In addition to being useful in a long nip press, the present invention also relates to process belts used in other papermaking and paper-processing applications, such as calendering used to smooth paper surfaces taking advantage of the longer period that the paper web is under a pressure load. Furthermore, other press belts used for transferring paper webs in the papermaking process also are subjected to environmental stress and abrasion, compression and heat. In any case, belts of these various varieties can be made, for example, by impregnating a woven base fabric, which takes the form of an endless loop, with a synthetic polymeric resin. Preferably, the resin forms a coating of some predetermined thickness on the inner surface of the belt, so that the yarns from which the base fabric is woven may be protected from direct contact with the arcuate pressure shoe component of the long nip press.

It is typically this coating, which usually has a smooth, impervious surface to slide readily over the lubricated shoe and to prevent any of the lubricating oil from penetrating the structure of the belt to contaminate the press fabric, or fabrics, and fibrous web.

Furthermore, the opposite surface or outer surface is also coated. This surface can be smooth or can have voids, such as grooves or blind-drilled holes to receive water pressed from the paper web or press fabric(s).

Such a coating, for example, a urethane coating applied to a process belt (which may be either grooved or un-grooved), may also serve as a barrier material to prevent permeation of water from the paper side of the belt to the shoe side, where the urethane coating is constantly in contact with warm (~50-60° C.) hydraulic oil.

In practice, during the operation of the long nip press, the belt is subjected to considerable mechanical and thermal stress. As the belt takes the form of an endless loop, it is directed through the long press nip subjecting the coating to a repeated stress that may ultimately lead to cracking of the coating.

Flex fatigue and cracking of the urethane coating of process belts is one of the shortcomings of current urethane material. This problem could be mitigated or eliminated by using softer or a less cross-linked urethane. However, softer (on an acceptable hardness scale like Shore C) or less cross-linked material tends to be less wear resistant and can allow groove closure in belts having grooves, which in turn reduces dewatering performance of the belts. Flex fatigue hysterisis and wear are also problems with roll coverings used in paper machines.

Thus, there is a need to improve resistance to flex fatigue, crack propagation and wear characteristics as well as delamination of urethane coatings in process belts and roll coverings, in addition to retarding permeation of water and oil; and in grooved belts resistance to groove closure.

For example, resistance to groove closure of the coating in a grooved belt typically needs resins of high dynamic modulus in the low strain regime; that is, strains of less than ten percent. In this connection, cast polyurethane elastomers are all segmented copolymers consisting of phases called "hard phase" and "soft phase." In addition, these cast polyurethane elastomers may be made by a one-step process or a two-step process. In the one-step process, the macroglycol, isocyanate and curative (also called a "chain extender") are all mixed together at one time. In the two-step process, the macroglycol and isocyanate are pre-reacted to form a prepolymer. This prepolymer is subsequently reacted with the curative. The latter approach is the most common one for making large castable parts.

Cast polyurethane articles include a wide range of forms and articles produced by pouring or pumping a reactive liquid polyurethane onto a substrate, or onto a mold. This broad category of polyurethane processing includes the single pass spiral (SPS) and multiple thin pass (MTP) coating processes that have been taught previously to produce process belts such as belts for shoe presses, shoe calenders and sheet transfer belts.

Increasing the dynamic modulus (of the polyurethane resin) typically requires increasing the volume fraction of the hard phase. This increase of the volume fraction of the hard phase can be achieved by increasing the weight percent of the isocyanate group or NCO, changing the type of NCO, or changing the composition of the curative.

However, increasing the modulus in this way generally increases the dynamic modulus as well as the breadth and location of the glass transition temperature. Therefore, in high strain-rate applications, such as papermaking process belt applications, the change in the weight percent of the hard segment content increases the risk of flex-cracking.

The above-noted polyurethane modifications which either increase dynamic modulus without changing the glass transition, or increase energy dissipation at the crack tip, may in either case increase abrasion resistance of polyurethane coated process belts.

Heretofore, the use of nanoparticles to improve the barrier properties and other characteristics of coatings has been proposed.

U.S. Pat. No. 6,616,814 refers to the use of nanoparticles in a press belt. However, only the surface of an outer layer is equipped with the nanoparticles for wear purposes. It is said that the nanoparticles in the wear resistant outer surface(s) can be equipped with fluorocarbon chains to give the outer layer a hydrophobic characteristic.

U.S. Pat. No. 5,387,172 is a fiber-reinforced plastic rolls coated with a synthetic resin and an abrasive filler powder (see, e.g. col. 3, lines 37-65) having various grain sizes (col. 3, line 66 - col. 4, line 19).

U.S. Pat. No. 5,298,124 is a coated transfer belt for use in paper manufacturing. The coating is a type of polymer and may contain a kaolin clay particulate filler. This filler provides a surface roughness, which decreases with an increase in applied pressure.

U.S. Pat. No. 6,036,819 is a method for improving the cleanability of coated belts. The polymer coating may include a particulate filler similar to that disclosed in U.S. Pat. No. 5,298,124.

U.S. Pat. No. 6,136,151 is a press belt, press roll cover, or long nip shoe belt, which use a clay filler in the polymeric coating. It is an alternative to belts as taught in U.S. Pat. No. 5,298,124.

U.S. Pat. No. 4,002,791 is a woven fabric polyurethane-coated belt. The coating contains walnut shell powder to increase its coefficient of friction.

U.S. Pat. No. 4,466,164 is a supercalendering apparatus using an elastic roll. The core metal roll has a first coating of fibrous material with inorganic (quartz) filler loaded epoxy resin impregnated in the fibrous material and a second coating of inorganic filler loaded epoxy resin formed on the first coating.

U.S. Pat. No. 6,200,248 is a ceramic roll with coating compositions including mixtures of chromium oxide and titanium dioxide as well as aluminum oxide and zirconium oxide.

U.S. Pat. No. 6,200,915 is a lightweight textile fabric used for automobile air bags. Among other fillers, vermiculite and mica are used to lower the friction value.

U.S. Pat. No. 6,290,815 is a paper sheet or laminate containing grit particles, which give it a high abrasion resistance while retaining a glossy surface.

U.S. Pat. No. 6,331,231 provides a paper web transfer belt with good paper releasability. Closed bubbles, microcapsules, or a particulate filler are mixed into the polymeric resin coating.

The present invention is an alternative to those disclosed in the above patents for improving any and all of the abovementioned characteristics of urethane coated process belts and roll coverings.

SUMMARY OF THE INVENTION

Accordingly, the present invention is a process belt and roll coverings incorporating nanoparticles in their coating specifically directed towards improving the flex fatigue, crack propagation, resistance to groove closure, and wear characteristics of urethane coatings in process belts and roll coverings. The present invention is also directed towards a means of retarding diffusion and permeation of fluids, such as water, and oil and combinations thereof.

This improvement is effected by incorporating nanoparticles, from about 0.01% up to about 10% by weight, into the coating materials. The coating can be castable, extendable, or solvent based, such as an aqueous coating.

The present invention also describes the incorporation of nanoparticles into castable or extrudable urethanes to improve fatigue crack resistance without compromising resistance to groove closure in grooved belts and roll coverings. These improvements are also effected for non-grooved belts.

The present invention provides that, for example, prior to mixing of a curative and a prepolymer, nanoparticles are pre-dispersed in one or both of these. Or, the nanoparticles can be pre-blended into substances from which a prepolymer is then made or the nanoparticles can be pre-dispersed in a plasticizer. In any case, the coating itself contains nanoparticles dispersed throughout resulting in the desired characteristics, not just on the surface of the coating for wear purposes.

The present invention will now be described in more complete detail with reference being made to the figures identified below.

BRIEF DESCRIPTION OF THE DRAWINGS

The present invention will now be described by way of example, in which reference will be made to the following Figures in which.

DETAILED DESCRIPTION OF THE INVENTION

Figure 1:
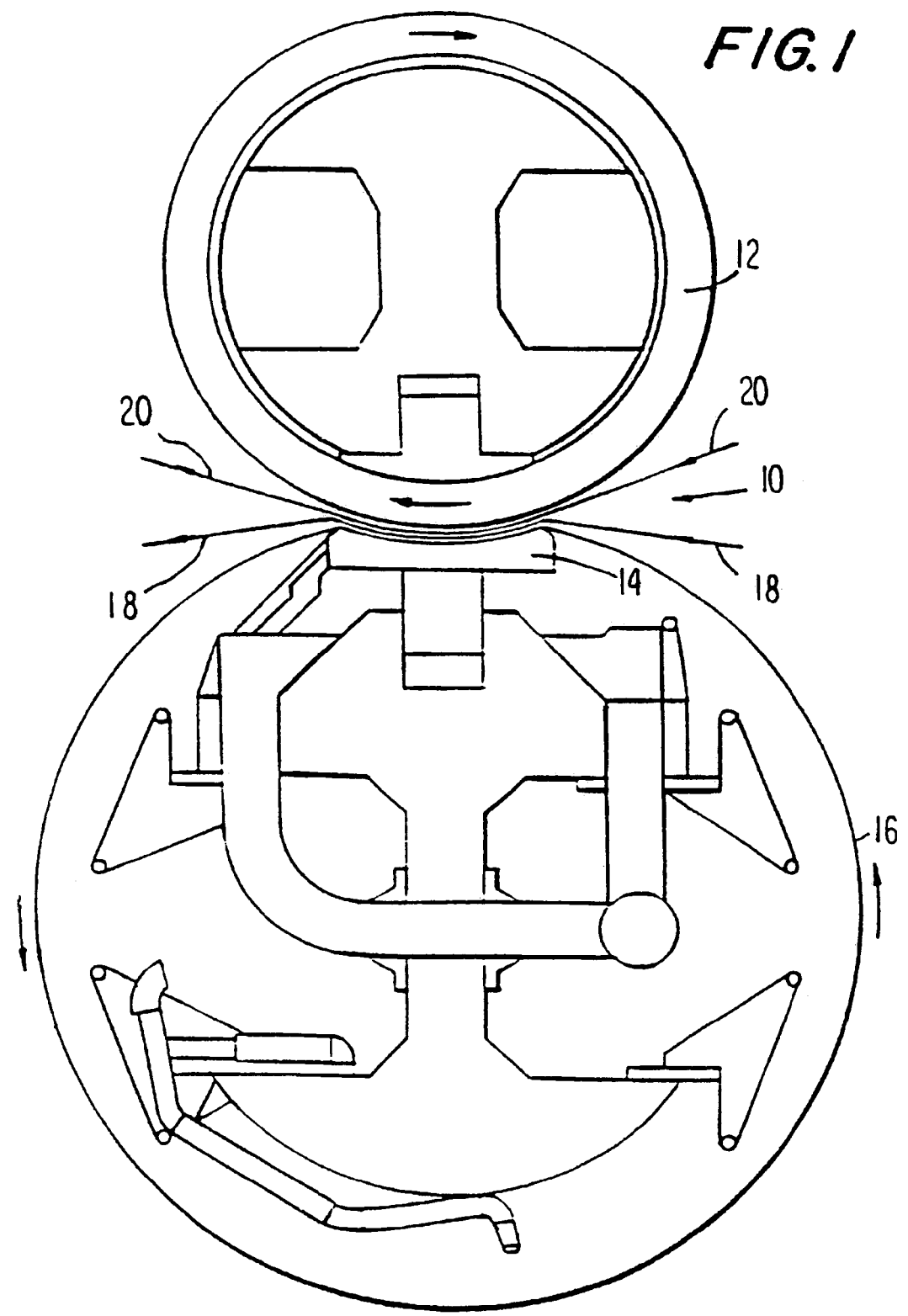
FIG. 1. is a side cross-sectional view of a long nip press of the shoe type.

In this disclosure, "comprises", "comprising", "containing", "having" and the like can have the meaning ascribed to them in U.S. Patent law and can mean "includes", "including", and the like. "Consisting essentially of" or "consists essentially of" likewise have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

It is an object of this invention to provide polyurethane elastomeric systems for belting products that have improved resistance to cracking, particularly flex cracking. Flex-cracking is a form of fatigue crack growth ("FCG") driven by bending stresses and strains. Flex-cracking of elastomers can be reduced by making an elastomer softer (e.g., of lower dynamic modulus), but in belting applications it is most important that improved flex-cracking be obtained without having to decrease the modulus. Otherwise, it would not be possible to keep the grooves open in grooved belt applications. Similarly, in shoe calender applications, it is desirable to maintain some minimum hardness (modulus) in order to retain abrasion resistance. The present invention provides a method of increasing the flex-cracking resistance of an elastomeric belting product without sacrificing modulus (hardness).

It is preferable to be able to increase the dynamic modulus of the material while also increasing the resistance to fatigue crack growth. If the dynamic modulus were increased, it would be preferable to obtain that increase without increasing the glass transition temperature of the material. The relative resistance of any elastomer to flex cracking can be assessed by measuring the high strain or low strain fatigue crack growth (FCG) properties of an elastomer.

FCG properties in the high strain regime can be measured with a Ross Flex test apparatus (such as, for example, ASTM D-1052; see also "Measuring Rubber Deterioration—Cut Growth Using Ross Flexing Apparatus"), where the thickness of the sample can be changed to create different levels of strain and variable rates of cracking. FCG properties in the low strain regime can assessed by using the concepts of fracture mechanics, and plotting crack growth rate versus tearing energy or strain as described in the technical literature. See "Fatigue and Fracture of Elastomers" by G. J. Lake (in Rubber Chemistry and Technology, vol. 68 (3), 1995, p 435) and "The Development of Fracture Mechanics for Elastomers" by A. G. Thomas (in Rubber Chemistry and Technology, vol. 67 (3), 1994, p G50). In the latter test method, a planar tension test specimen can be used, and it also possible to capture dynamic modulus data at the same time that the fatigue crack growth data is being generated. Many elastomers have non-linear visco-elastic behavior, which means that the dynamic modulus will shift somewhat with the magnitude of the dynamic strain or dynamic stress.

The present invention provides a method of improvement in resistance to fatigue crack growth, which comprises the addition of nanoparticles to the polyurethane. There are many different methods for preparing polyurethane resin systems for coating, casting or the like; those knowledgeable in the art will recognize the different ways in which inorganic particles can be integrated into the polyurethane.

Several different urethane-based materials may be used for the coating in the present invention, including any of those typically used for belts and roll coverings in various processes within the paper and textile industries. Such urethanes may be either castable or extrudable urethanes. For use in the present invention, urethanes can also be water-based, millable gums, or foams. Certain applications may determine the type of urethane that is used.

According to the present invention, the amount of nanoparticles added to the urethane-based coating is determined experimentally for each system and generally can range between about 0.01% to about 10%, about 0.1% to about 5%, preferably about 1% to about 5%, inclusive, by weight of the total weight of the mixture. However, higher addition levels (up to, for example, 10% by weight) may be added.

Nanoparticles (particles ranging in size from, for example, 1 to 100 nm) that may be used in the belt coating of the present invention include but are not limited to clay, carbon black, silica, silicon carbide, or metallic oxides such as alumina. The nanoparticles may be present in various sizes, wherein the individual nanoparticles are not of uniform size, but in total do not exceed an average size distribution of 100 nm. The nanoparticles of the invention can also be in the form of "platelets", wherein the average width of one platelet can be about 1 mm or larger, but ranging in length from about 100-500 nm, preferably 200-300 nm. The preferred size range of the nanoparticles is less than or equal to 30 nm. The metallic oxides can include various forms of aluminum oxide, titanium oxide, iron oxide, zinc oxide, indium oxide, tin oxide, antimony oxide, cerium oxide, yttrium oxide, zirconium oxide, copper oxide, nickel oxide and/or tantalum oxide and combinations thereof. For example, in one embodiment, alumina, which is uncoated, epoxysilane coated or octylsilane coated was added to 1% by weight.

Clays used may include montmorillonite such as but not limited, to Cloisite(® 30B, saponite, hectorite, mica, vermiculite, bentonite, nontronite, beidellite, volkonskoite, manadiite and kenyaite and combinations thereof. Clays used in the invention can include naturally occurring products or chemically modified clays.

In the particular case of naturally occurring alumino-silicate minerals such as clay, the clay has a sheet-like layered structure such that the individual layers can be delaminated such that the individual clay platelets are nano-sized. The individual platelet may be approximately 1 nm thick and the aspect ratio can be 100-1000. When the platelets are completely delaminated such that the nanocomposite has discrete silicate layers, the clay is said to be "exfoliated". When some of the silicate layers are still stacked face to face and resin has penetrated to some extent into the space between the sheets, the clay is said to be "intercalated". It is also possible for the clay to take on a mixture of forms.

The nanoparticles may be incorporated into, for example, urethanes to widen the formulation latitude and improve flex fatigue crack resistance. Experimental data point to two mechanisms for effecting such improvement; that is, the delocalization of damage at the nanoparticle, and/or, the suppression of crazing and crack growth at the nanometer scale.

Coatings of urethane are generated by mixing a urethane prepolymer with a curative. The curing reaction between the prepolymer and the curative causes chain extension of the prepolymer, branching of the prepolymer and, the formation of a crosslinked network. For purposes of this invention, the term "prepolymer" means the reaction product formed when an excess of organic diisocyanate monomer is reacted with a macroglycol or macroglycol blend.

Polyurethanes are formed when diol chain extenders are used, as polyalkylmethylene ether glycols and alcohols bond to isocyanates to form urethane linkages. Any isocyanate useful in preparing polyurethanes from polyether glycols, isocyanates and diols can be used in this invention. They include, but are not limited to, 2,4-toluene diisocyanate, 2,6-toluene diisocyanate ("TDI"), 4,4'-diphenylmethane diisocyanate or ("MDI"), 4,4'-dicyclohexylmethane diisocyanate ("H$_{12}$ MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylyene diisocyanate, isophorone diisocyanate ("IPDI"), and combinations thereof. The invention also provides aliphatic, cycloaliphatic, and aromatic polyisocyanates, e.g., the alkylene diisocyanates and the aryl diisocyanates. MDI and TDI are preferable for use in the present invention.

Macroglycols useful in the preparation of the urethane nanocomposite products of the invention can have a number average molecular weight (MW) of at least 250, e.g., polyethers, polyester macroglycols, and the like. The number average molecular weight of the macroglycol can be as high as, e g., about 10,000 or as low as about 250.

A preferred high MW macroglycol is a polyalkylene ether macroglycol having a general formula HO(RO)$_n$H, wherein R is an alkylene moiety and n is an integer large enough that the polyether macroglycol has a number average molecular weight of at least about 250. Such polyalkylene ether macroglycols are well known and can be prepared by the polymerization of cyclic ethers, such as alkylene oxides and glycols, dihydroxyethers, and the like, employing methods known in the art Another preferred high MW macroglycol is a polyester macroglycol. Polyester macroglycols can be prepared by reacting dibasic acids (usually adipic acid, but other components, such as sebacic or phthalic acid, may be present) with diols such as ethylene glycol; 1,2-propylene glycol; 1,3 propanediol, 1,4 butanediol; diethylene glycol; tetramethylene ether glycol, and the like. Another useful polyester macroglycol can be obtained by the addition polymerization of ϵ-caprolactone in the presence of an initiator.

Other useful macroglycols include polycarbonates, which are commercially available from Bayer (Leverkusen, Germany), and macroglycols that have two bydroxyl groups and whose backbone is obtained by polymerization or copolymerization of such monomers as butadiene and isoprene.

Particularly preferred macroglycols useful in the invention can include dihydroxypolyesters, polytetramethylene ether glycols (PTMEG), and the polycarbonates.

A "curative" is a compound or mixture of compounds, such as a curative blend, that link long molecules together and thereby complete a polymer reaction. A curative can also be a "chain-extender" in the context of the present invention. In polyurethane systems, the curative is comprised of hydroxyl (or amine)-terminated compounds that react with isocyanate groups present in the mixture. Examples of diol curatives or chain extenders can be ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl- 1,5-pentanediol, 2-methyl-2-ethyl- 1,3-propanediol, 1,4-bis(hydroxyethoxy)benzene, bis(hydroxyethylene)terephthalate, hydroquinone bis(2-hydroxyethyl) ether (HQEE), and combinations thereof. Examples of diamine curatives or chain extenders include, but are not limited to, 1,2-ethylenediamine, 1,6-hexanediamine, 1,2-propanediamine, 4,4'-methylene-bis(3-chloroaniline) (also known as 3,3'-dichloro-4,4'-diaminodiphenylmethane) ("MOCA" or "Mboca"), dimethylthiotoluenediamine ("DMTDA"), 4,4'-diaminodiphenylmethane ("DDM"), 1,3-diaminobenzene, 1,4-diaminobenzene, 3,3'-dimethoxy-4,4'-diamino biphenyl, 3,3'-dimethyl-4,4'-diamino biphenyl, 4,4'-diamino biphenyl, 3,3'-dichloro-4,4'-diamino biphenyl, and combinations thereof.

Curatives also useful in the present invention include, but are not limited to, 4,4'-methylene-bis(2-chloroaniline) (MBCA); 4,4'-methylene-bis(3-chloro-2,6-diethylaniline) (MCDEA); diethyl toluene diamine (DETDA); tertiary butyl toluene diamine (TBTDA); dimethylthio-toluenediamine; trimethylene glycol di-p-amino-benzoate; methylenedianiline (MDA); methylenedianiline-sodium chloride complex (Caytur® 21 and 31 from Uniroyal Chemical Company, Inc). In a preferred embodiment, a blend of diol and amine curatives is used.

Catalysts are not necessary to prepare the polyurethanes or polyurethane ureas, but provide advantages in their manufacture. The catalysts most widely used are tertiary amines and organo-tin compounds, and they can be used in the one-shot process, in making prepolymers, and in making polyurethanes or polyurethane ureas from prepolymers.

Additives can be incorporated into the polyether glycol, prepolymer, or polyurethane by known techniques. Useful additives include polyhydroxy functional branching agents; delusterants (e.g., titanium dioxides, zinc sulfide or zinc oxide); colorants (e.g., dyes); stabilizers (e.g., antioxidants like hindered phenols and amines); ultraviolet light stabilizers; heat stabilizers, etc.); fillers; flame retardants; pigments; antimicrobial agents; antistatic agents; optical brightners; extenders; processing aids; viscosity boosters; plasticizers, and other functional additives.

Prior to mixing of the curative and the prepolymer, nanoparticles are pre-dispersed in the curative, or in the prepolymer, or pre-dispersed in both curative and prepolymer. Or, the nanoparticles can be pre-blended into substances from which a prepolymer is then made. In some applications, it may be advantageous to disperse the nanoparticles in an additive, such as a plasticizer.

Referring now to the several figures, a long nip press (LNP) of the shoe type for dewatering a fibrous web being processed into a paper product on a paper machine is shown in a side cross-sectional view in FIG. 1. The press nip 10 is defined by a smooth cylindrical press roll 12 and an arcuate pressure shoe 14. The arcuate pressure shoe 14 has about the same radius of curvature as the cylindrical press roll 12. The distance between the cylindrical press roll 12 and the arcuate pressure shoe 14 may be adjusted by hydraulic means operatively attached to arcuate pressure shoe 14 to control the loading of the nip 10. Smooth cylindrical press roll 12 may be a controlled crown roll matched to the arcuate pressure shoe 14 to obtain a level cross-machine nip pressure profile.

Endless belt structure 16 extends in a closed loop through nip 10, separating press roll 12 from arcuate pressure shoe 14. A press fabric 18 and a cellulosic fibrous web 20 being processed into a paper sheet pass together through nip 10 as indicated by the arrows in FIG. 1. Fibrous web 20 is supported by press fabric 18 and comes into direct contact with smooth cylindrical press roll 12 in nip 10. Fibrous web 20 and press fabric 18 proceed through the nip 10 as indicated by the arrows.

Alternatively, fibrous web 20 may proceed through the nip 10 between two press fabrics 18. In such a situation, the press roll 12 may be either smooth or provided with void-volume means, such as grooves or blind-drilled holes.

In either case, the side of endless belt structure 16 facing the press fabrics 18 may also be smooth or provided with void-volume means.

In any event, endless belt structure 16, also moving through press nip 10 as indicated by the arrows, that is, counter-clockwise as depicted in FIG. 1, protects press fabric 18 from direct sliding contact against arcuate pressure shoe 14, and slides thereover on a lubricating film of oil. Endless belt structure 16, accordingly, must be impermeable to oil, so that press fabric 18 and fibrous web 20 will not be contaminated thereby.

Figure 2:
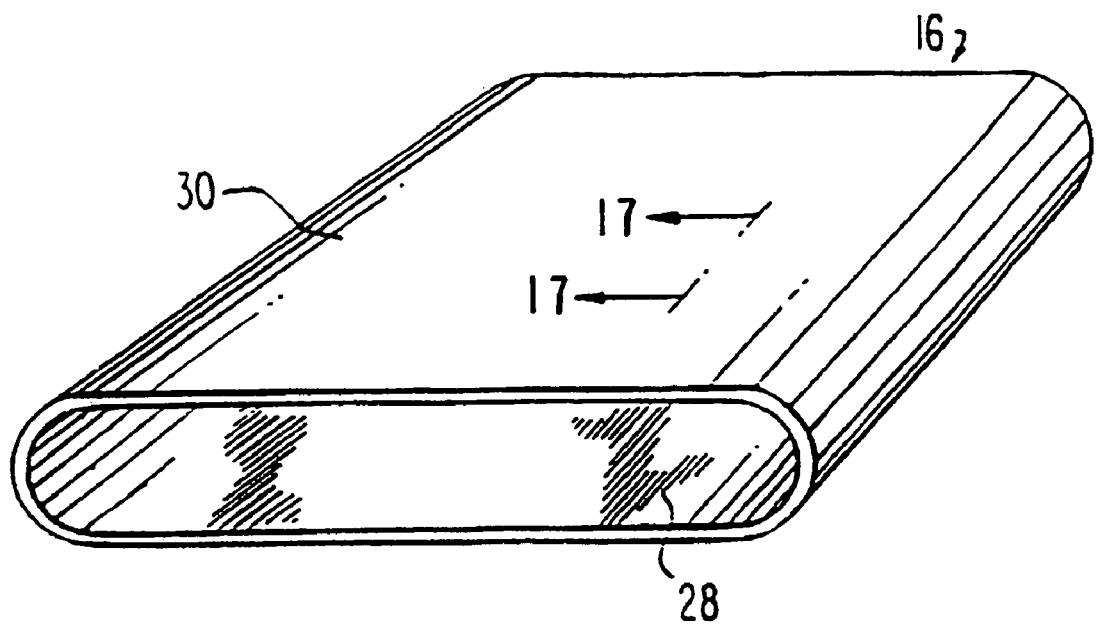
FIG. 2. is a perspective view of a belt made in accordance with the method of the present invention.

A perspective view of the long nip press belt 16 is provided in FIG. 2. The belt 16 has an inner surface 28 and an outer surface 30.

Figure 3:
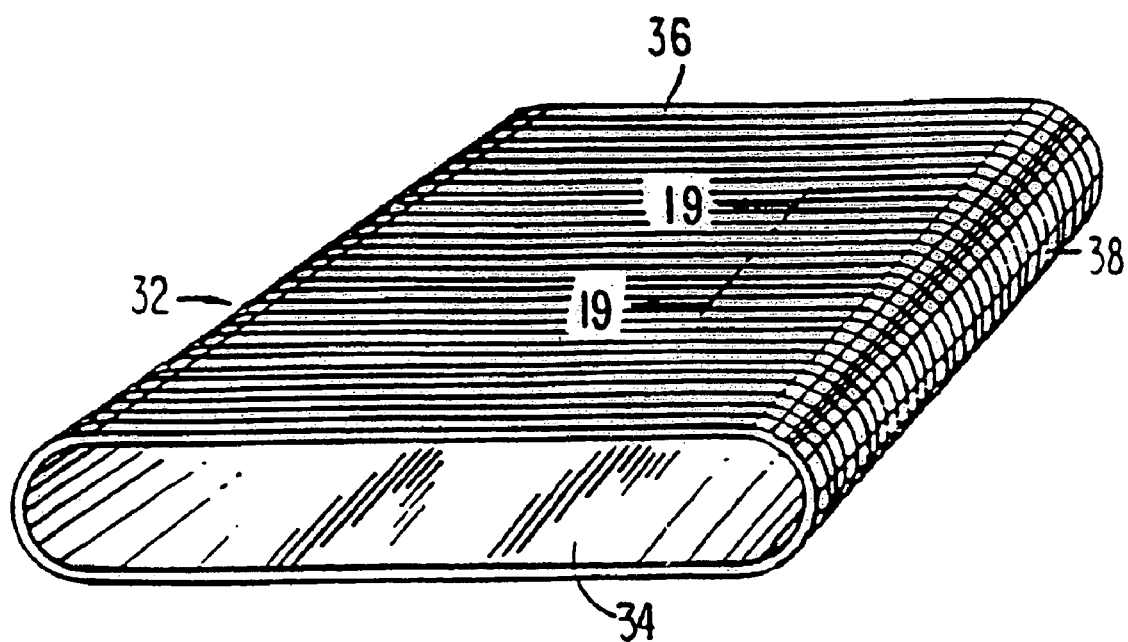
FIG. 3. is a perspective view of a grooved belt.

FIG. 3 is a perspective view of a grooved belt embodiment 32. The belt 32 has an inner surface 34 and an outer surface 36. The outer surface 36 is provided with a plurality of grooves 38, for example, in the longitudinal direction around the belt 32 for the temporary storage of water pressed from fibrous web 20 or press fabric 18 in press nip 10.

A resin coating is applied to the inner surface 34 and outer surface 36 of the belt 32. As the inner surface 34 slides across the lubricated arcuate pressure shoe 14, the coating ideally renders the belt impermeable to oil and water.

In one embodiment, the present invention is a process belt or roll cover with a urethane coating such that the coating incorporates nanoparticles as a means for improving flex fatigue, crack propagation, resistance to groove closure, and wear characteristics of the coating. The coating of the present invention also provides an improved means for retarding diffusion and permeation of both water and oil, among other fluids, through the coating layer. The above improvements are effected by incorporating nanoparticles (for example, up to 10% by weight) into the urethane-based coating.

Figure 4:
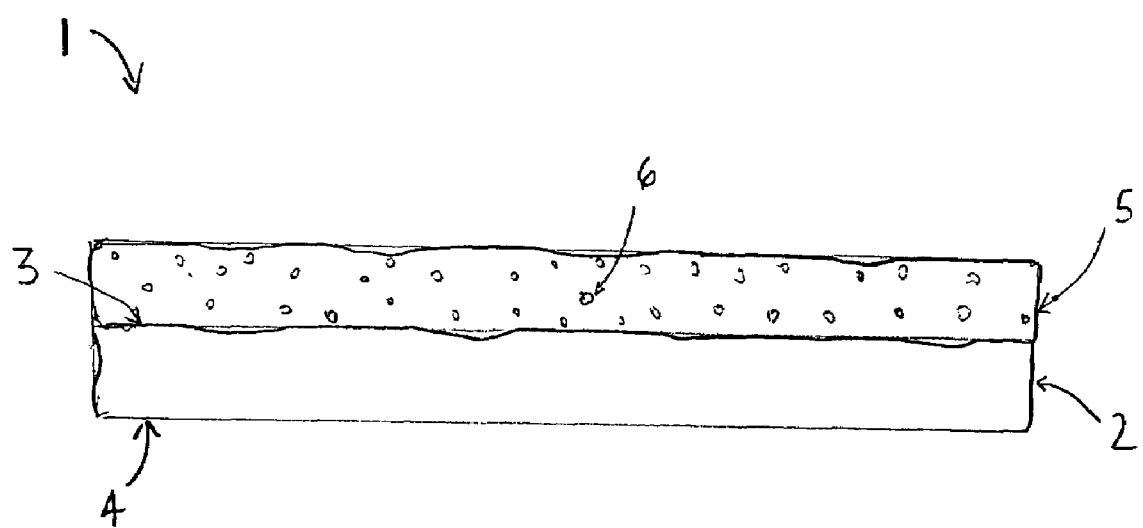
FIG. 4 is a cross sectional view of the belt of FIG. 2, incorporating the teachings of the present invention.

Turning now to FIG. 4, there is shown a cross section of an example of a belt 1 having the desired properties and characteristics. Briefly, the base 2 may take a variety of forms, woven or non-woven having a first side 3 and second side 4. In the embodiment shown in FIG. 4, the first side 3 of the base 2 is coated with the urethane coating 5 incorporating the nanoparticles 6.

As a press belt or long nip shoe press belt, the base can be any commonly used structure available to one skilled in the art. The belt in either case can be endless or on-machine-seamable. As a press roll cover, different reinforcement structures could be used as needed to give the roll cover adequate structural integrity, known to those skilled in the art.

The following examples illustrate the present invention in more detail.

EXAMPLES

Example 1

A test sample of an elastomeric polyurethane/clay nano-composites based on poly(propylene glycol), glycerol propoxylated and toluene-diisocyanate are synthesized by an intercalative polymerization technology. Introducing approximately 7.5% by weight clay nanoparticles into the composite results in more than a two-fold increase in the tensile strength of the resin composite and a five-fold increase in the elongation "at break" as compared to a sample of pure polyurethane.

Example 2

A test sample of polyurethane nanocomposite based on poly(tetramethylene glycol), MDI and 1,4-butanediol is synthesized. At only 1% montmorillonite nanoparticle concentration, there results a two-fold increase in tensile strength and a three-fold increase in the elongation of the polyurethane nanocomposites compared to a sample of pure polyurethane.

Example 3

A sample of a unmodified polyurethane resin system used as a conventional polyurethane system was made from a polyether MDI prepolymer. The curative was a blend of conventional chain extenders selected from the class of aromatic amines and diols. The blend composition was selected in such a way to give adequate working life ("potlife") and hardness when mixing in a conventional benchtop laboratory mixer. The curative blend was mixed with the nanoparticles prior to mixing with the prepolymer. The method described herein was also used in Example 4.

Nano-alumina particles (average particle size 37 nm) were supplied by Nanophase. Zinc Oxide particles (average particle size 36 nm) were also supplied by Nanophase. The supplier also supplied these particles pretreated. "Epoxy silane" treated means that the particle was pretreated with (3-glycidoxypropyl)trimethoxysilane. "Octyl silane" means that the particle was treated with n-octyltriethoxysilane. Cloisite 20A, Cloisite 30B and Cloisite Na+ were supplied by Southern Clay Products, Inc. The $Na^+$ clay had no organic modifier, whereas the 20A and 30B represent different types of organically modified clays.

The state of dispersion of the clay platelets in the final composite (e.g., "intercalated" vs. "exfoliated") was controlled by varying the sample preparation conditions.

The materials were tested in a Planar Tension Fatigue Crack Growth Test. Compound A comprised 1.58 volume % of octylsilane coated alumina. Compound B comprised 1.0 wt. % of exfoliated Cloisite 20A, which corresponded to 0.62% vol of Cloisite 20A. Compound C comprised 0.56 volume % of exfoliated Cloisite 30 B. The FCG test was conducted with a haversine pulse with a minimum strain of 0%. FCG testing was done over a range of strains. The data shown below in Tables 1-3 represent the average of data taken on 4 or 5 replicates, varying the dynamic tensile strain.

TABLE 1

Planar Tension FCG Test at 5% Dynamic Tensile Strain

| Composition | Dynamic Modulus (MPa) | Fatigue Crack Growth Rate (mm/cycle) | Normalized Dynamic Modulus | Normalized FCG |
|---|---|---|---|---|
| Unfilled casting | 83 | 1.57E−03 | 1 | 1.00 |
| A | 84 | 4.45E−04 | 1.01 | 0.29 |
| B | 88 | 4.12E−04 | 1.06 | 0.26 |
| C | 92 | 4.28E−04 | 1.11 | 0.27 |

TABLE 2

Planar Tension FCG Test at 7% Dynamic Tensile Strain

| Composition | Dynamic Modulus (MPa) | Fatigue Crack Growth Rate (mm/cycle) | Normalized Dynamic Modulus | Normalized FCG |
|---|---|---|---|---|
| Unfilled casting | 73 | 5.02E−03 | 1 | 1.00 |
| A | 73 | 1.67E−03 | 0.99 | 0.33 |
| B | 85 | 7.06E−04 | 1.16 | 0.14 |
| C | 80 | 1.30E−03 | 1.10 | 0.26 |

TABLE 3

Planar Tension FCG Test at 9% Dynamic Tensile Strain

| Composition | Dynamic Modulus (MPa) | Fatigue Crack Growth Rate (mm/cycle) | Normalized Dynamic Modulus | Normalized FCG |
|---|---|---|---|---|
| Unfilled casting | 64 | 1.41E−02 | 1 | 1.00 |
| A | 62 | 2.85E−03 | 0.98 | 0.20 |
| B | 68 | 2.25E−03 | 1.07 | 0.16 |
| C | 69 | 2.84E−03 | 1.09 | 0.20 |

These results are surprising because they show that the rate of fatigue crack growth in a nano-modified material can be less than 30% of the rate in a non-modified material mixed under the same conditions. Furthermore, this increase in resistance to fatigue crack growth can be obtained without a loss of modulus. In fact, in some cases, slow crack growth occurs even when the modulus of the material increases.

The samples were all tested by standard solvent swell methods for relative crosslink density, which indicated that the increase in resistance to fatigue crack growth could not be attributed to any downward shifts in chemical crosslink density. Thus, the increase in resistance to fatigue crack growth had to be due to interactions between the growing crack and the dispersed particles.

The above results suggest that the differences between modified and unmodified materials are maintained even as the strain is increased. Thus, the differences should be observed even in a high strain test such a Ross Flex test, in Example 4.

Example 4

The caliper of the prepared samples was set such that the samples would crack at a measurable rate within a reasonable period of time, e.g., within a test segment of 50, 000 cycles. The theoretical maximum tensile strain was 28%-29%. The nature of the test does not allow one to determine the dynamic modulus in the course of testing. However, the relative stiffness or hardness of the resin can be assessed with a an analogue or Digital Shore C Durometer, per ASTM D -2240.

Figure 5:
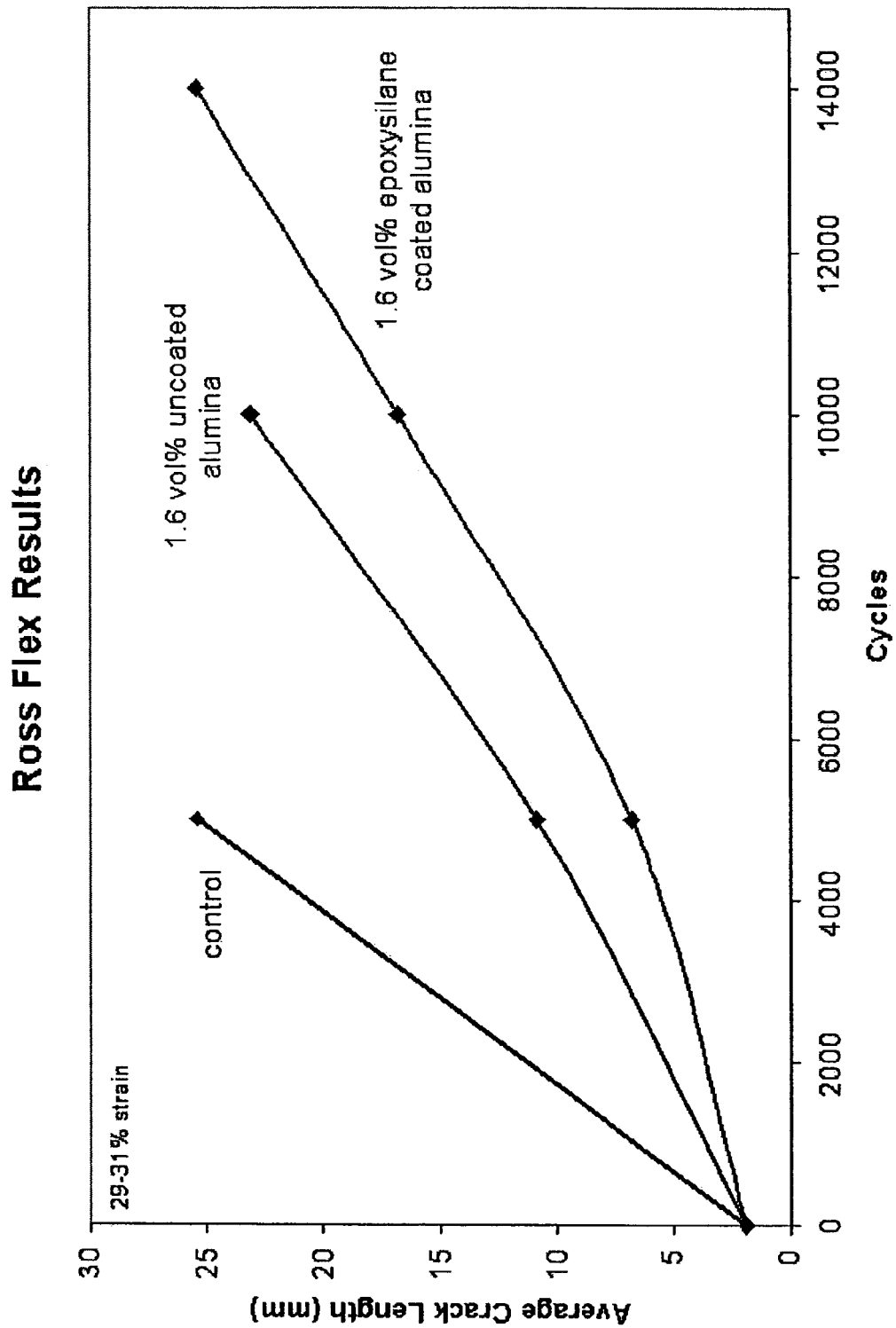
FIG. 5 is a graph showing the average crack length per number of cycles comparing a urethane resin control, with uncoated alumina, and coated alumina materials in the resin.

The FCG behavior may be gleaned from a plot of crack length versus number of flex cycles, or from a tabulation of the crack lengths at some given number of cycles. The Ross Flex data reflects the average of 4 replicates (FIG. 5).

The hardness reflects the average of results generated on 6 replicates, shown in Table 4.

TABLE 4

Average Hardness of Modified and Unmodified Materials

| Composition | Average Crack Length at 5000 cycles, mm | Digital Shore C |
|---|---|---|
| 0 vol % particles | 25.4 | 69.6 |
| 1.58 vol % uncoated alumina | 10.9 | 67.9 |
| 1.58 vol % epoxysilane coated alumina | 6.8 | 68.8 |

The small shifts in hardness are insignificant and cannot account for the large shift in cracking rates (The durometer precision is +/−1 unit).

Figure 6:
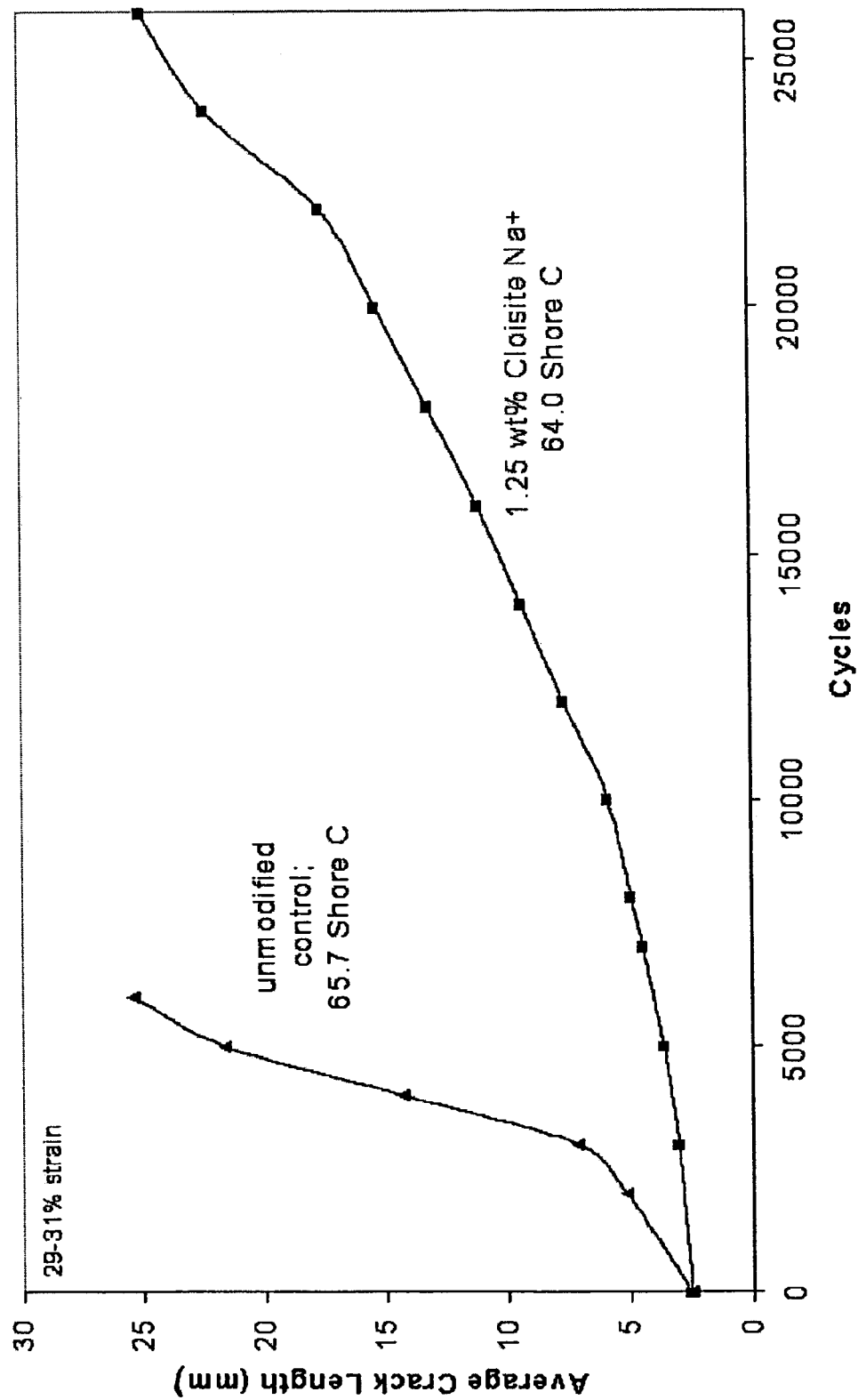
FIG. 6 is a graph showing the average crack length per number of cycles comparing a urethane resin control and a clay-modified material in the urethane resin.

FIG. 6 shows a graph depicting the average crack length in millimeters over a number of cycles, for a clay-modified material.

Modifications to the above would be obvious to those of ordinary skill in the art, but would not bring the invention so modified beyond the scope of the appended claims. For example while the discussion of present invention refers to process belts and roll covers, it has applicability to other belts in the papermaking industry and other industrial applications.

All documents cited in this application ("herein-cited documents") and all documents cited or referenced in herein-cited documents are incorporated herein by reference. In addition, any manufacturer's instructions or catalogues for any products cited or mentioned in each of the application documents or herein-cited documents are incorporated by reference. Documents incorporated by reference into this text or any teachings therein can be used in the practice of this invention. Documents incorporated by reference into this text are not admitted to be prior art.

What is claimed is:

1. A papermaking process belt or textile belt, comprising a urethane-based coating comprising nanoparticles, wherein at least one of the following characteristics is improved: resistance to crack propagation, resistance to groove closure, or wear characteristics.

2. The belt in claim 1, wherein the nanoparticles range in size from about 1 to about 100 nanometers.

3. The belt in claim 1, wherein the nanoparticles are in an amount of between about 0.01% to about 10% by weight.

4. The belt in claim 1, wherein the nanoparticles are in an amount of between about 0.1% to about 5% by weight.

5. The belt in claim 1, wherein the nanoparticles are in an amount of between about 1% to about 5% by weight.

6. The belt in claim 1, wherein said urethane is extrudable.

7. The belt in claim 1, wherein said urethane is castable.

8. The belt in claim 1, wherein said urethane is a foam.

9. The belt in claim 1, wherein said urethane is water-based.

10. The belt in claim 1, wherein said urethane is a millable gum.

11. The belt in claim 1, wherein the urethane is castable and is made by mixing a urethane prepolymer and a curative.

12. The belt in claim 11, wherein prior to mixing of the curative and the prepolymer, the nanoparticles are pre-dispersed in at least one of said curative or said prepolymer.

13. The belt in claim 1, wherein the urethane is castable and is made by mixing a urethane prepolymer, a curative, a plasticizer, and optionally a pigment.

14. The belt in claim 13, wherein prior to mixing of the curative, the prepolymer and the plasticizer, the nanoparticles are pre-dispersed in at least one of said curative, said prepolymer, or said plasticizer.

15. The belt in claim 1, wherein the nanoparticles in the coating are comprised of modified clay, carbon black, silicon carbide, silica or metallic oxides, or combinations thereof.

16. The belt in claim 15, wherein the modified clay nanoparticles in the coating is comprised of montmorillonite, saponite, hectorite, mica, vermiculite, bentonite, nontronite, beidellite, volkonskoite, manadiite or kenyaite, or combinations thereof.

17. The belt in claim 15, wherein said metallic oxides nanoparticles in the coating is comprised of aluminum oxide, titanium oxide, iron oxide, zinc oxide, indium oxide, tin oxide, antimony oxide, cerium oxide, yttrium oxide, zirconium oxide, copper oxide, nickel oxide or tantalum oxide, or combinations thereof.

18. The belt in claim 1, wherein said nanoparticles improve the resistance to permeation of water or oil through said coating.

19. The belt in claim 18, wherein said belt is a process belt used in papermaking.

20. A method of increasing flex-cracking resistance of a papermaking process belt or textile belt, comprising the step of: applying a urethane-based coating to a surface of the belt, said coating comprising nanoparticles, and wherein said flex-cracking resistance is achieved without sacrificing its modulus.

* * * * *